United States Patent
Wu et al.

(10) Patent No.: US 9,647,878 B2
(45) Date of Patent: May 9, 2017

(54) ANNOUNCEMENT METHOD, DEVICE AND SYSTEM

(71) Applicant: ZTE Corporation, Shenzhen (CN)

(72) Inventors: Shaoyong Wu, Shenzhen (CN); Yuxi Gan, Shenzhen (CN); Jin Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 79 days.

(21) Appl. No.: 14/420,707

(22) PCT Filed: Jun. 8, 2013

(86) PCT No.: PCT/CN2013/076990
§ 371 (c)(1),
(2) Date: Feb. 10, 2015

(87) PCT Pub. No.: WO2013/178097
PCT Pub. Date: Dec. 5, 2013

(65) Prior Publication Data
US 2015/0195125 A1    Jul. 9, 2015

(30) Foreign Application Priority Data
Aug. 16, 2012 (CN) .......................... 2012 1 0292227

(51) Int. Cl.
*H04L 12/703* (2013.01)
*H04L 12/709* (2013.01)
(Continued)

(52) U.S. Cl.
CPC .......... *H04L 41/0654* (2013.01); *H04L 41/06* (2013.01); *H04L 45/28* (2013.01); *H04L 45/245* (2013.01); *H04L 45/50* (2013.01)

(58) Field of Classification Search
CPC ... H04L 12/437; H04L 41/0654; H04L 45/04; H04L 45/22; H04L 45/245; H04L 45/28;
(Continued)

(56) References Cited

U.S. PATENT DOCUMENTS

| | | | |
|---|---|---|---|
| 6,049,523 A * | 4/2000 | Anderson | H04L 1/22 370/217 |
| 6,317,426 B1 * | 11/2001 | Afanador | H04L 49/606 370/352 |

(Continued)

FOREIGN PATENT DOCUMENTS

| | | |
|---|---|---|
| CN | 101035053 A | 9/2007 |
| CN | 101075935 A | 11/2007 |

(Continued)

OTHER PUBLICATIONS

International Search Report of PCT/CN2013/076990, dated Sep. 19, 2013.

*Primary Examiner* — Michael Thier
*Assistant Examiner* — Eric Nowlin
(74) *Attorney, Agent, or Firm* — Banner & Witcoff, Ltd.

(57) ABSTRACT

An announcement method, apparatus and system are provided. The method includes: an announcement node configuring sending ports of the announcement node in a first region and a second region, wherein, the first region and the second region apply different network protection switching technologies; the announcement node acquiring a protection switching request sent from the first region; and the announcement node sending the protection switching request to the second region through the sending port corresponding to the second region, wherein, a post-switching link state of the first region is contained in the protection switching request, and under a situation that the post-switching link state of the first region is inconsistent with a current link state of the second region, the second region (Continued)

needs to perform protection switching and otherwise does not need to perform the protection switching.

11 Claims, 5 Drawing Sheets

(51) Int. Cl.
  *H04L 12/723* (2013.01)
  *H04L 12/24* (2006.01)
(58) Field of Classification Search
  CPC ..... H04L 45/50; H04L 49/557; H04L 41/044;
  H04L 41/046; H04L 41/06; H04L
  41/0631; H04L 41/0659; H04L 41/0663;
  H04L 41/0668; H04L 41/0681; H04L
  41/0806; H04L 41/0843; H04L 41/0856;
  H04L 41/0893; H04L 41/22; H04L 45/24;
  H04L 69/40
  See application file for complete search history.

(56) References Cited

U.S. PATENT DOCUMENTS

| | | | | |
|---|---|---|---|---|
| 6,848,006 B1* | 1/2005 | Hermann | ............ | H04J 14/0227 |
| | | | | 398/24 |
| 7,471,625 B2* | 12/2008 | Suemura | ............... | H04L 12/437 |
| | | | | 370/223 |
| 7,821,951 B2* | 10/2010 | Douville | ................ | H04L 45/04 |
| | | | | 370/230 |
| 8,456,984 B2* | 6/2013 | Ranganathan | .......... | H04L 49/70 |
| | | | | 370/216 |
| 8,559,334 B2* | 10/2013 | Iovanna | ................ | H04L 45/02 |
| | | | | 370/254 |
| 8,681,634 B2* | 3/2014 | Zhang | .................... | H04L 45/04 |
| | | | | 370/238 |
| 8,718,039 B2* | 5/2014 | Skoog | ................ | H04J 14/0227 |
| | | | | 370/252 |
| 8,750,127 B2* | 6/2014 | Zhang | .................... | H04L 45/00 |
| | | | | 370/238 |
| 9,264,300 B2* | 2/2016 | O'Connor | ............ | H04L 41/0659 |
| 2002/0093954 A1* | 7/2002 | Weil | ........................ | H04L 45/22 |
| | | | | 370/389 |
| 2003/0026281 A1* | 2/2003 | Limaye | ................... | H04J 3/085 |
| | | | | 370/430 |
| 2003/0086368 A1* | 5/2003 | Limaye | ................... | H04J 3/085 |
| | | | | 370/216 |
| 2004/0085895 A1* | 5/2004 | Zettinger | ................... | H04L 1/22 |
| | | | | 370/220 |
| 2007/0271468 A1* | 11/2007 | McKenney | ......... | G06F 11/1004 |
| | | | | 713/189 |
| 2009/0022069 A1* | 1/2009 | Khan | ................... | H04L 12/4633 |
| | | | | 370/256 |
| 2009/0147672 A1 | 6/2009 | Chun et al. | | |
| 2009/0207726 A1 | 8/2009 | Thomson et al. | | |
| 2010/0309821 A1* | 12/2010 | Sergeev | ................ | H04L 12/462 |
| | | | | 370/256 |
| 2011/0141880 A1* | 6/2011 | Suwala | ............... | H04L 12/4633 |
| | | | | 370/217 |
| 2011/0176409 A1* | 7/2011 | Dong | .................. | H04L 41/0677 |
| | | | | 370/217 |
| 2012/0113835 A1* | 5/2012 | Alon | ................... | H04L 43/0817 |
| | | | | 370/252 |
| 2012/0294140 A1* | 11/2012 | Cheung | ................... | H04L 45/24 |
| | | | | 370/216 |
| 2013/0202286 A1* | 8/2013 | Boyd | ................... | H04B 10/032 |
| | | | | 398/5 |
| 2013/0294226 A1* | 11/2013 | Lim | ........................ | H04L 69/40 |
| | | | | 370/225 |
| 2014/0233373 A1* | 8/2014 | O'Connor | ........... | H04L 41/0663 |
| | | | | 370/228 |
| 2014/0307538 A1* | 10/2014 | Iovanna | ................. | H04L 45/64 |
| | | | | 370/218 |
| 2016/0036521 A1* | 2/2016 | Miyabe | ................. | H04J 3/1652 |
| | | | | 398/5 |
| 2016/0036622 A1* | 2/2016 | Ye | ....................... | H04L 41/0663 |
| | | | | 370/225 |
| 2016/0112303 A1* | 4/2016 | Yoo | ......................... | H04L 45/24 |
| | | | | 398/45 |
| 2016/0142286 A1* | 5/2016 | Kim | ....................... | H04L 45/28 |
| | | | | 370/218 |

FOREIGN PATENT DOCUMENTS

| | | |
|---|---|---|
| CN | 101594191 A | 12/2009 |
| CN | 102843291 A | 12/2012 |
| EP | 2498454 A1 | 9/2012 |
| WO | 2011066810 A1 | 6/2011 |

* cited by examiner

ANNOUNCEMENT METHOD, DEVICE AND SYSTEM

TECHNICAL FIELD

The present document relates to the communication field, and in particular, to an announcement method, apparatus and system.

BACKGROUND

In the network application, along with the development of the operator network towards the multi-service bearer direction, such as three-network integration, especially the requirements of various services on the interface, forwarding and protection technology and so on of the network are not the same, multiple forwarding technologies are deployed in the network. In order to improve the reliability of the network, multiple network protection switching technologies are extensively applied. Because each kind of protection switching technology is limited in a certain application field, different network forwarding technologies have their own protection switching technologies, and even multiple protection switching technologies exist in the forwarding technology in the same one network. So, in order to guarantee the reliable end-to-end transmission of the service at the full path, it is required that different protection switching technologies are able to perform the cooperative processing.

For example, in Ethernet, there exist the technologies, such as the Ethernet double protection and Multi-Chassis Link Aggregation Group (abbreviated as MC-LAG) protection. The Ethernet double protection technology refers to a protection switching method that there are two links, in one network region, connected topologically to the node out of the region respectively, wherein, one link performs the backup for the other link; the MC-LAG protection technology refers to a technology that one node and more than two nodes compose a link aggregation group. When under the situation that there is a part of networking of the network has the Ethernet double protection and another part of networking has the MC-LAG protection, then during the protection switching, it is required that the above-mentioned two technologies can perform the cooperative processing so as to ensure the full path connection of the service.

FIG. 1 is a networking diagram of an Ethernet double protection and an MC-LAG protection according to the related art; as shown in FIG. 1, in the Ethernet networking, the Ethernet double protection technology is used among nodes S1, S3 and S4, and the MC-LAG protection technology is used among S2, S3 and S4. Wherein, in the Ethernet double networking composed by S1, S3 and S4, when the link is failure-free, the node S1 blocks the standby port (port 2), and the flow is transmitted from the main port (port 1); in the MC-LAG networking composed by S2, S3 and S4, when the link is failure-free, the link between S4-S2 is set as the non-active link, and the flow is transmitted through the link between S3-S2. So when the link is failure-free, the transmission path of the service flow is S1-S3-S2.

FIG. 2 is a diagram of problem of cooperatively processing between an Ethernet double protection and an MC-LAG protection according to the related art; as shown in FIG. 2, when the S2-S3 link in the network breaks down, the link between the nodes S3-S2 becomes the non-active link according to the mechanism of the MC-LAG, and the link between the nodes S4-S2 becomes the active link. Because there is no announcement mechanism between the MC-LAG protection technology and the Ethernet double protection technology, the switching of the MC-LAG is not announced to the double protection technology in order to perform the corresponding switching; as to the double networking composed by the nodes S1, S3 and S4, the service flow is still transmitted through S1-S3, while the node S3 is unable to transmit to S2, which causes the flow interruption.

Besides that the cooperation problem of the protection switching exists between the above-mentioned Ethernet double protection and the MC-LAG, the switching cooperation problem also exists among other various protection technologies, for example, the Ethernet ring network protection, the linear protection of the Multi-Protocol Label Switching (abbreviated as MPLS) network, the ring network protection of the MPLS network, the linear protection of the Synchronous Digital Hierarchy (abbreviated as SDH) network, the ring network protection of the SDH network and the multi-chassis protection, etc. While in the real application of the network, the scene that different protection switching technologies perform the networking is more and more general; if it is unable to perform the cooperative processing among different protection switching technologies, it will cause the network failure, and will hinder the application of the network protection switching technology to a great extent.

Aiming at the problem that different protection switching technologies in the related art are unable to perform the cooperative processing, the effective solution is not provided yet at present.

SUMMARY

Aiming at the problem in the related art that different protection switching technologies cannot perform cooperative processing, the embodiment of the present document provides an announcement method, apparatus and system, to at least solve the above-mentioned problem.

The embodiment of the present document provides an announcement method, comprising:

an announcement node configuring sending ports of the announcement node in a first region and a second region, wherein, the first region and the second region apply different network protection switching technologies;

the announcement node acquiring a protection switching request sent from the first region; and the announcement node sending the protection switching request to the second region through a sending port corresponding to the second region, wherein, a post-switching link state of the first region is contained in the protection switching request, and under a situation that the post-switching link state of the first region is inconsistent with a current link state of the second region, the second region needs to perform protection switching; and under a situation that the post-switching link state of the first region is consistent with the current link state of the second region, the second region does not need to perform the protection switching.

Alternatively, after the step of the announcement node sending the protection switching request to the second region through a sending port corresponding to the second region, further comprising:

the second region judging whether the post-switching link state of the first region is consistent with the current link state of the second region and whether a priority of the protection switching request is no lower than a priority of a path failure request of the second region itself;

under a situation of determining that the post-switching link state of the first region is inconsistent with the current link state of the second region and the priority of the protection switching request is no lower than the priority of the path failure request of the second region itself, the second region confirming to perform the protection switching.

Alternatively, the step of the announcement node sending the protection switching request to the second region through a sending port corresponding to the second region comprises:

the announcement node re-encapsulating the protection switching request according to a format of the second region; and the announcement node sending the re-encapsulated protection switching request to the second region through the sending port corresponding to the second region.

Alternatively, the different network protection switching technologies applied the first region and the second region comprises at least two of the following:

an Ethernet double protection, a multi-chassis link aggregation group (MC-LAG) protection, an Ethernet ring network protection, a linear protection of a multi-protocol label switching (MPLS) network, a ring network protection of the MPLS network, a linear protection of a synchronous digital hierarchy (SDH) network, a ring network protection of the SDH network and a multi-chassis protection.

The embodiment of the present document further provides an announcement apparatus, located in an announcement node, comprising:

a configuration module, configured to: configure sending ports of the announcement node in a first region and a second region, wherein, the first region and the second region apply different network protection switching technologies;

an acquiring module, configured to: acquire a protection switching request sent from the first region; and a sending module, configured to: send the protection switching request to the second region through a sending port corresponding to the second region, wherein, a post-switching link state of the first region is contained in the protection switching request, and under a situation that the post-switching link state of the first region is inconsistent with a current link state of the second region, the second region needs to perform protection switching; and under a situation that the post-switching link state of the first region is consistent with the current link state of the second region, the second region does not need to perform the protection switching.

Alternatively, the sending module comprises:

an encapsulation module, configured to: re-encapsulate the protection switching request according to a format of the second region; and a sending module, configured to: send the re-encapsulated protection switching request to the second region through the sending port corresponding to the second region.

The embodiment of the present document further provides an announcement system, comprising an announcement apparatus located in an announcement node as described in claim 5 or 6, and a protection switching apparatus located in a second region; wherein, the protection switching apparatus comprises:

a judgment module, configured to: judge whether a post-switching link state of a first region is consistent with a current link state of the second region and whether a priority of a protection switching request is no lower than a priority of a path failure request of the second region itself; and a confirmation module, configured to: confirm whether to perform protection switching according to a judgment result of the judgment module.

Alternatively, the judgment module is further configured to: judge whether the post-switching link state of the first region is consistent with the current link state of the second region; and the confirmation module is configured to: under a situation of the judgment module determines that the post-switching link state of the first region is inconsistent with the current link state of the second region and the priority of the protection switching request is no lower than the priority of the path failure request of the second region itself, confirm to perform the protection switching.

Through the method, apparatus and system of the embodiment of the present document, the problem in the related art that different protection switching technologies cannot perform cooperative processing is solved, the occurrence of a flow interruption problem caused by different protection switching technologies in networking is avoided, and the network robustness and stability are improved.

BRIEF DESCRIPTION OF DRAWINGS

The accompanying drawings described herein are used to provide further understanding for the present document, and constitute a part of the present application. The illustrated embodiments of the present document and the description thereof are used to explain the present document, rather than constituting an inappropriate limitation to the present document. Wherein.

PREFERRED EMBODIMENTS OF THE PRESENT DOCUMENT

The embodiment of the present document is described in detail with reference to the accompanying drawings hereinafter. It should be illustrated that, in the case of not conflicting, the embodiments in the present application and features in these embodiments can be combined with each other.

Figure 3:
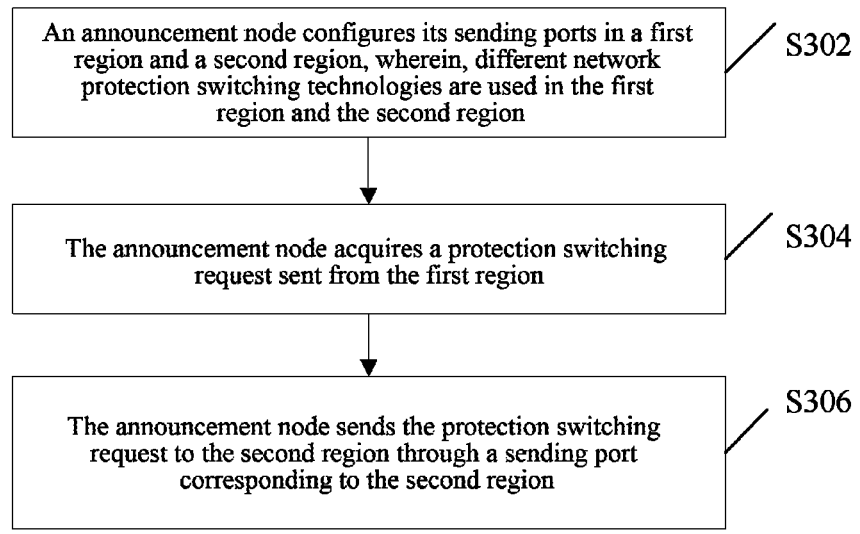
FIG. 3 is a flow chart of an announcement method according to an embodiment of the present document.

The present embodiment provides an announcement method. FIG. 3 is a flow chart of an announcement method according to an embodiment of the present document. As shown in FIG. 3, the method includes the following steps.

In step S302, an announcement node configures its sending ports in a first region and a second region, wherein, the first region and the second region apply different network protection switching technologies.

In step S304, the announcement node acquires a protection switching request sent from the first region.

In step S306, the announcement node sends the protection switching request to the second region through a sending port corresponding to the second region, wherein, a post-switching link state of the first region is contained in the protection switching request, and under a situation that the post-switching link state of the first region is inconsistent with a current link state of the second region, the second region needs to perform protection switching; and under a situation that the post-switching link state of the first region is consistent with the current link state of the second region, the second region does not need to perform the protection switching.

In the present embodiment, through the above-mentioned steps, between the first region and the second region which apply different network protection switching technologies, the protection switching request of the first region is announced to the second region through the common nodes of the two regions (that is, the above-mentioned announcement nodes), which makes the second region know that the first region performs the protection switching, thus being able to make the second region confirm whether the second region itself needs to perform the protection switching according to the protection switching performed by the first region, which provides the technical support for the cooperative networking of the two regions which apply different network protection switching technologies, and solves the problem in the related art that different protection switching technologies cannot perform cooperative processing, avoids the occurrence of a flow interruption problem caused by different protection switching technologies in networking, and improves the network robustness and stability.

Alternatively, in the situation that the second region itself has the path failure request, the second region can further judge whether the post-switching link state of the first region is consistent with the current link state of the second region and whether a priority of the protection switching request sent from the announcement node is no lower than a priority of a path failure request of the second region's own; if the post-switching link state of the first region is inconsistent with the current link state of the second region and the priority of the protection switching request is higher than or equal to the priority of the path failure request of the second region's own, then the second region can confirm to perform the protection switching; if the post-switching link state of the first region is consistent with the current link state of the second region or the priority of the protection switching request is lower than the priority of the path failure request of the second region's own, for example, under the situation that the second region only has one available link, then the second region can confirm not to perform the protection switching.

As a preferred embodiment, because the first region and the second region apply different network protection switching technologies, the data transmission formats in these two regions may be different as well. In this case, in the step S306 the announcement node can also re-encapsulate the protection switching request from the first region according to the format of the second region, and send the re-encapsulated protection switching request to the second region through the sending port corresponding to the second region. Through this way, the application scope of the present scheme is promoted.

Alternatively, the different network protection switching technologies applied the first region and the second region comprises at least two of the following: an Ethernet double protection, a multi-chassis link aggregation group (MC-LAG) protection, an Ethernet ring network protection, a linear protection of a multi-protocol label switching (MPLS) network, a ring network protection of the MPLS network, a linear protection of a synchronous digital hierarchy (SDH) network, a ring network protection of the SDH network and a multi-chassis protection.

Corresponding to the above-mentioned method, the present embodiment further provides an announcement apparatus located in an announcement node and used for realizing the above-mentioned embodiments and preferred execution modes, and the already explained ones will not go into details again. As used in the following, the term "module" is the combination of the software and/or hardware which can realize the preset function. Although the apparatus described by the following embodiments is realized by the software preferably, the realization through the hardware or the combination of the software and the hardware is also possible and conceived.

Figure 4:
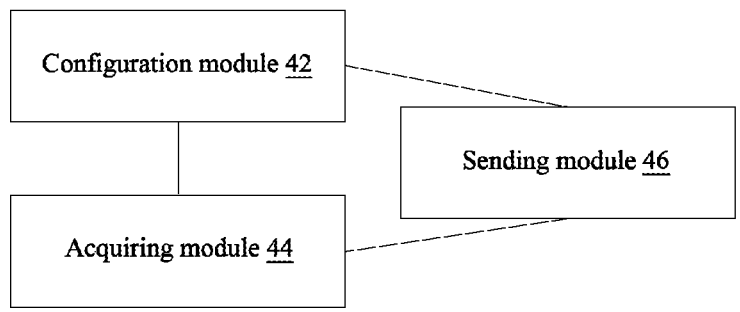
FIG. 4 is a structure block diagram of an announcement apparatus according to an embodiment of the present document.

FIG. 4 is a structure block diagram of an announcement apparatus according to an embodiment of the present document. As shown in FIG. 4, the apparatus includes: a configuration module 42, an acquiring module 44 and a sending module 46. Each module is explained in detail hereinafter.

The configuration module 42 is configured to: configure sending ports of the announcement node in a first region and a second region, wherein, the first region and the second region apply different network protection switching technologies; the acquiring module 44 is configured to: connect to the configuration module 42 and acquire a protection switching request sent from the first region; and the sending module 46 is configured to: connect to the configuration module 42 and the acquiring module 44, and send the protection switching request to the second region through a sending port corresponding to the second region, wherein, a post-switching link state of the first region is contained in the protection switching request, and under a situation that the post-switching link state of the first region is inconsistent with a current link state of the second region, the second region needs to perform protection switching; and under a situation that the post-switching link state of the first region is consistent with the current link state of the second region, the second region does not need to perform the protection switching.

In the present embodiment, through the above-mentioned modules, between the first region and the second region which apply different network protection switching technologies, the protection switching request acquired from the first region by the acquiring module 44 is announced to the second region via the sending module 46 through the common nodes of the two regions (that is, the above-mentioned announcement nodes), which makes the second region know that the first region performs the protection switching, thus being able to make the second region confirm whether the second region itself needs to perform the protection switching according to the protection switching performed by the first region, which provides the technical support for the cooperative networking of the two regions which apply different network protection switching technologies, and solves the problem in the related art that different protection switching technologies cannot perform cooperative processing, avoids the occurrence of a flow interruption problem caused by different protection switching technologies in networking, and improves the network robustness and stability.

Figure 5:
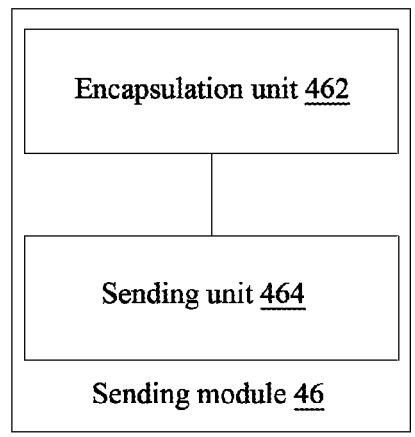
FIG. 5 is a preferred structure block diagram of a sending module according to an embodiment of the present document.

FIG. 5 is a preferred structure block diagram of the sending module 46 according to an embodiment of the present document. As shown in FIG. 5, the sending module 46 can include: an encapsulation unit 462, configured to: re-encapsulate the protection switching request according to a format of the second region; and a sending unit 464, configured to: connect to the encapsulation unit 462 and send the protection switching request re-encapsulated by the encapsulation unit 462 to the second region through the sending port corresponding to the second region.

Figure 6:
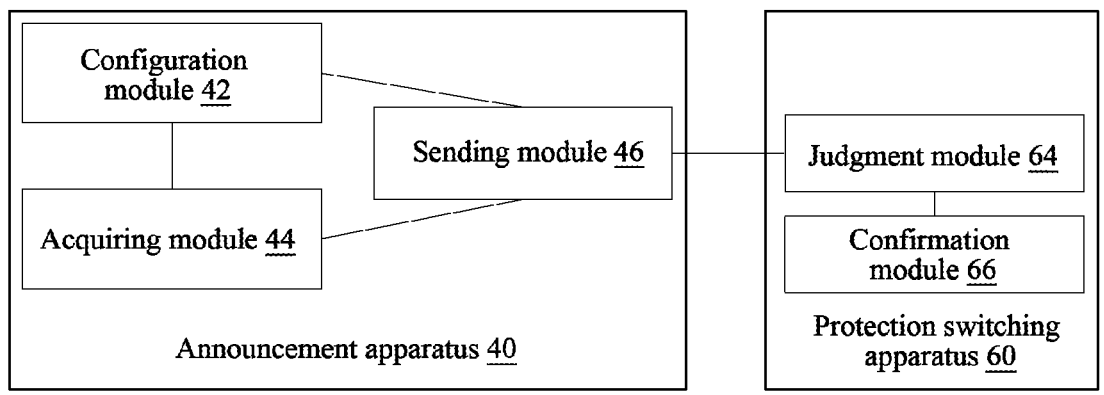
FIG. 6 is structure block diagram of an announcement system according to an embodiment of the present document.

The present embodiment further provides an announcement system. FIG. 6 is structure block diagram of the announcement system according to an embodiment of the present document. As shown in FIG. 6, the system includes an announcement apparatus 40 located in an announcement node (it is explained by using the announcement apparatus in FIG. 4 as an example in FIG. 6) and further includes a protection switching apparatus 60 located in the second region; wherein, the protection switching apparatus 60 includes: a judgment module 64, configured to: connect to the sending module 46 and judge whether a post-switching link state of a first region is consistent with a current link state of the second region and whether a priority of a protection switching request is no lower than a priority of a path failure request of the second region itself; and a confirmation module 66, configured to: connect to the judgment module 64 and confirm whether to perform protection switching according to a judgment result of the judgment module 64. The judgment module 64 is further configured to: judge whether the post-switching link state of the first region is consistent with the current link state of the second region; and the confirmation module 66 is configured to: under a situation of the judgment module determines that the post-switching link state of the first region is inconsistent with the current link state of the second region and the priority of the protection switching request is no lower than the priority of the path failure request of the second region itself, confirm to perform the protection switching.

It is explained by combining the preferred embodiments hereinafter, and the following preferred embodiments combine the above-mentioned embodiments and their preferred execution modes.

In the following preferred embodiments, a method for announcing and processing the network switching is provided, which announces other network protection technologies to perform the corresponding processing when the network protection technology is switched over. The scheme can include the following steps.

In step S2, the parameter of the network protection switching announcement is configured on the announcement node, and the parameter at least can include the sending port of the announcement.

In step S4, the announcement node receives the protection switching message in the first region, and the information at least can include the switched request and the post-switching link.

In step S6, the announcement node sends the protection switching announcement information frame to the configured sending port, wherein, the protection switching announcement information frame at least can include the above-mentioned received protection switching message, and the encapsulation of the frame header is performed according to the network protection switching technology of the second region to which the sending port belongs.

In step S8, after the node in the second region receives the above-mentioned protection switching announcement information frame, it extracts the protection switching information therein, and confirms whether to perform the switching according to the corresponding switching request and the link state.

In step S10, if the node of the second region determines that the priority of the request of the above-mentioned protection switching announcement information frame is lower than the priority of its own current request, or the link state of the above-mentioned protection switching announcement information frame is consistent with its own current link state, then there is no need to switch; if the node for judging the second region determines that the priority of the request of the above-mentioned protection switching announcement information frame is no lower than the priority of its own current request, and the link state of the above-mentioned protection switching announcement information frame is inconsistent with its own current link state, then it needs to switch.

By adopting the above-mentioned method, when the protection switching technology in one network region performs the switching, the switching information of the present region is announced to another network region through the announcement node; while the node in another network region confirms whether to perform the switching through comparing its own current request and link state with the request and the link state in the protection switching announcement information frame. When the link in one network region breaks down and performs the switching, the announcement node announces the switching information to other network regions; if the priority of the request of other network regions is lower than the priority of the failure request, then the corresponding link switching will also be performed. Different protection switching technologies can be cooperative, to make the service flow resume again and guarantee the connecting of the service flow on the full path.

Embodiment One

Figure 7:
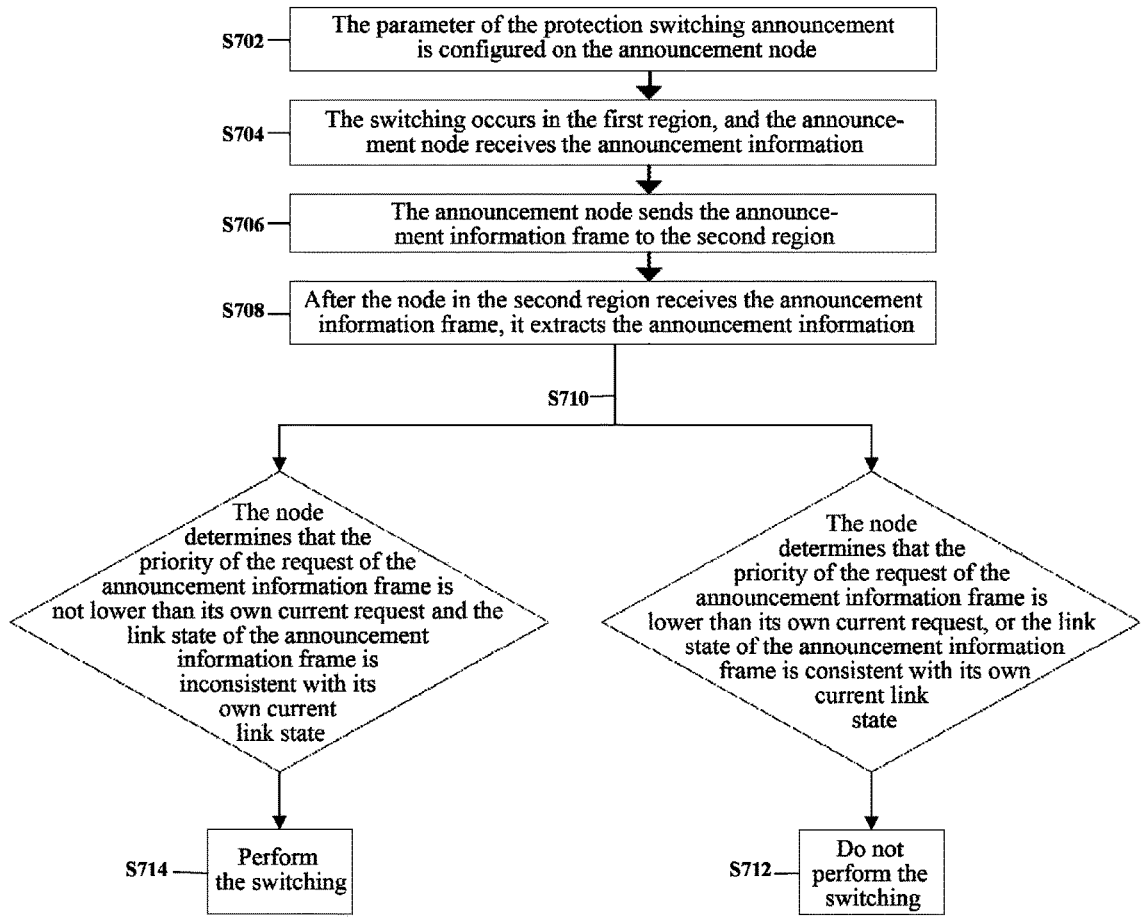
FIG. 7 is a flow chart of a method for announcing and processing a network switching according to embodiment one of the present document.

FIG. 7 is a flow chart of a method for announcing and processing a network switching according to embodiment one of the present document. As shown in FIG. 7, the method includes the following steps.

In step S702, the parameter of the network protection switching announcement is configured on the announcement node, and the parameter at least can include the sending port of the announcement.

In step S704, the announcement node receives the protection switching message in the first region, and the information at least can include the switched request and the post-switching link.

In step S706, the announcement node sends the protection switching announcement information frame to the configured sending port, wherein, the protection switching announcement information frame at least can include the above-mentioned received protection switching message, and the encapsulation of the frame header is performed according to the network protection switching technology of the second region to which the sending port belongs.

In step S708, after the node in the second region receives the above-mentioned protection switching announcement information frame, it extracts the protection switching information therein, and confirms whether to perform the switching according to the corresponding switching request and the link state.

In step S710, if the node for judging the second region determines that the priority of the request of the above-mentioned protection switching announcement information frame is lower than the priority of its own current request or the link state of the above-mentioned protection switching announcement information frame is consistent with its own current link state, then step S712 is entered; if the node for judging the second region determines that the priority of the request of the above-mentioned protection switching announcement information frame is no lower than the priority of its own current request, and the link state of the above-mentioned protection switching announcement information frame is inconsistent with its own current link state, then step S714 is entered.

In step S712, there is no need to perform the switching.

In step S714, it needs to perform the switching.

Embodiment Two

Figure 8:
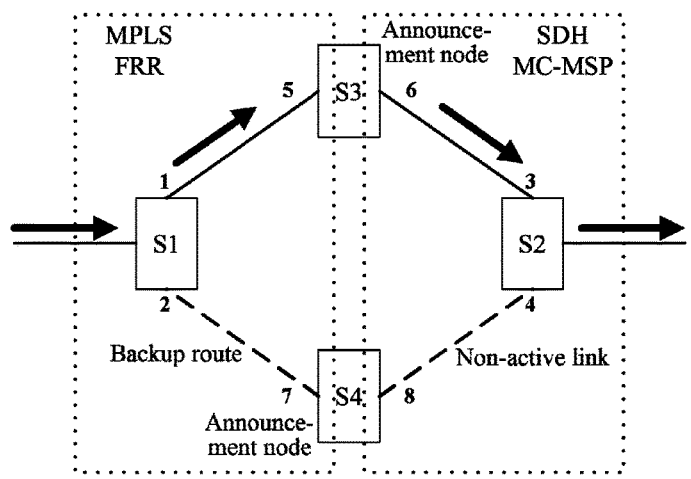
FIG. 8 is a networking diagram of MPLS and SDH technologies according to embodiment two of the present document.

FIG. 8 is a networking diagram of MPLS and SDH technologies according to embodiment two of the present document. As shown in FIG. 8, the MPLS technology is among the nodes S1, S3 and S4, which uses the Fast Re-Route (abbreviated as FRR) protection switching technology; and the SDH technology is among the nodes S2, S3 and S4, which uses the Multi-Chassis MultiPlex Section Protection (abbreviated as MC-MSP) protection switching technology.

Wherein, in the FRR networking composed by the S1, S3 and S4, when the link is failure-free, the route egress port of the node S1 is the port 1, and the service flow is transmitted on the S1-S3; in the MC-MSP networking composed by the S2, S3 and S4, when the link is failure-free, the link between S2-S3 is the active link, and the service flow is transmitted on the S2-S3. So, on the full path, when the link is failure-free, the transmission path of the service flow is S1-S3-S2. The nodes S3 and S4 are the announcement nodes, that is, the nodes announcing to each other the protection switching information among different protection switching technologies are usually located at the junction of the action regions of the two protection switching technologies. When the configuration is made on the announcement node, if the protection switching information is received from the MC-MSP side, then the protection switching announcement information frame is sent to the egress port of the FRR side; if the protection switching information is received from the FRR side, then the protection switching announcement information frame is sent to the MC-MSP side.

Figure 9:
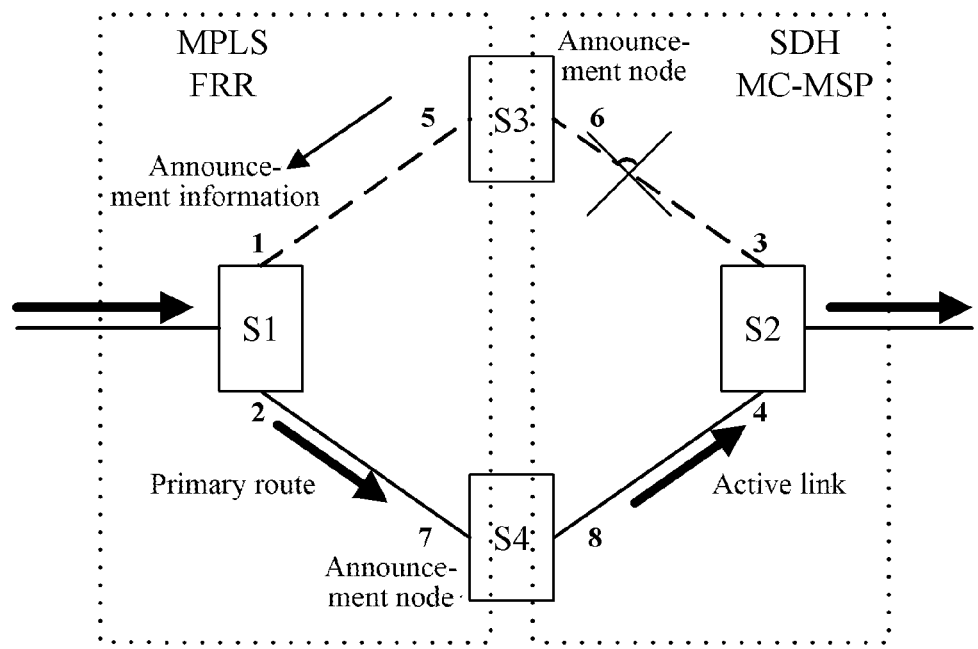
FIG. 9 is a cooperative processing diagram between the MPLS and the SDH according to embodiment two of the present document.

FIG. 9 is a cooperative processing diagram between the MPLS and the SDH according to embodiment two of the present document. As shown in FIG. 9, when the S2-S3 link in the network breaks down, according to the mechanism of the MC-MSP, the link between the nodes S2-S3 becomes the non-active link, and the link between the nodes S2-S4 becomes the active link. After the announcement node S3 or S4 receives the protection switching information of the MC-MSP, according to the content of the embodiment of the present document, the protection switching announcement information frame is sent to the egress port of the FRR side, including information about that the switching request of the MC-MSP is a working path failure and the post-switching link state is that the active link switches to the protection path. The frame header of the sent protection switching announcement information frame is encapsulated according to the frame format of the FRR region, to enable the node S1 receive the frame. After the node S of the FRR region receives the protection switching announcement information frame, it extracts the protection switching information therein; since the current FRR has no protection switching request, the priority is lower than the priority of the working path failure request in the protection switching announcement information frame, and the flow of the current FRR region is transmitted on the primary route, which is inconsistent with the situation that the active link is the protection path in the protection switching announcement information frame, therefore, the FRR needs to perform the switching; and after the switching, the service flow is transmitted on the egress port 2 of the original backup route. In this way, the service flow is transmitted according to the path of S1-S4-S2 again, which guarantee the fast recovery and connection of the service flow.

Figure 10:
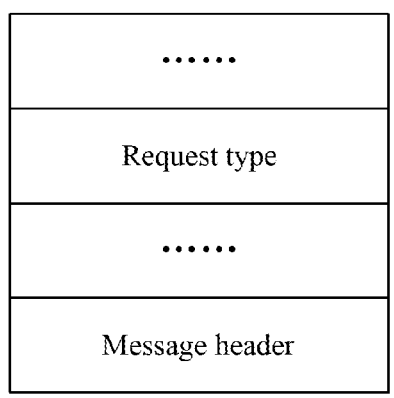
FIG. 10 is a diagram of an announcement information frame according to embodiment two of the present document.

Wherein, after the announcement node S3 or S4 receives the protection switching information of the MC-MSP, according to the scheme of the present preferred embodiment, FIG. 10 is a diagram of an announcement information frame according to embodiment two of the present document. The format of the protection switching announcement information frame sent to the egress port of the FRR side comprises at least the information as shown in FIG. 10. The request type therein includes at least the working path failure, the working path recovery, the protection path failure, and the protection path recovery. The method for sending the announcement information frame includes only sending the announcement information frame once, sending the announcement information frame periodically, etc.

Embodiment Three

Figure 1:
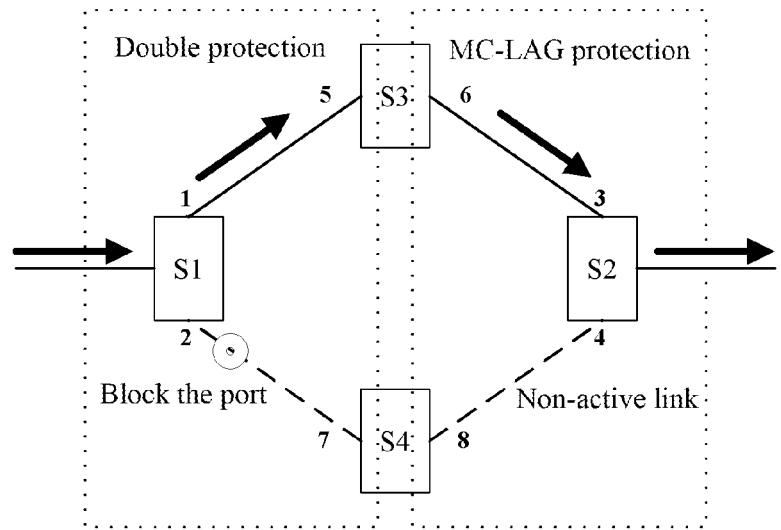
FIG. 1 is a networking diagram of an Ethernet double protection and an MC-LAG protection according to the related art.

The double protection and the MC-LAG protection as shown in FIG. 1 apply the technology of this preferred embodiment. In the Ethernet networking, the Ethernet double protection technology is used among nodes S1, S3 and S4, and the MC-LAG protection technology is used among S2, S3 and S4. Wherein, in the Ethernet double networking composed by S1, S3 and S4, when the link is failure-free, the node S1 blocks the standby port (port 2), and the flow is transmitted from the main port (port 1); in the MC-LAG networking composed by S2, S3 and S4, when the link is failure-free, the link between S4-S2 is set as the non-active link, and the flow is transmitted through the link between S3-S2. So when the link is failure-free, the transmission path of the service flow is S1-S3-S2.

Figure 2:
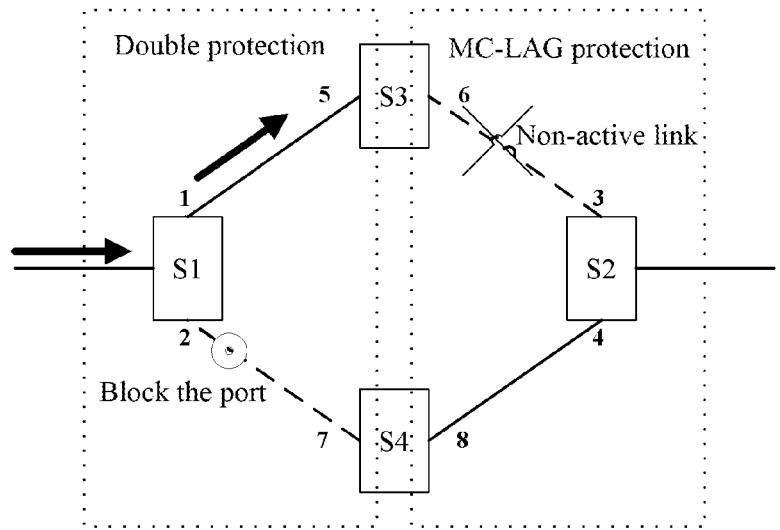
FIG. 2 is a diagram of cooperatively processing problem between an Ethernet double protection and an MC-LAG protection according to the related art.

As shown in FIG. 2, when the S2-S3 link in the network breaks down, according to the mechanism of the MC-LAG, the link between the nodes S3-S2 becomes the non-active link, and the link between the nodes S4-S2 becomes the active link. By applying the method of the present preferred embodiment, the node S3 announces the switching of the MC-LAG to the double protection region, and the double protection region performs the corresponding switching; as to the double networking composed by the nodes S1, S3 and S4, the service flow is switched to S1-S4 for transmission, and the transmission of the flow is reconnected on the path S1-S4-S2.

Alternatively, besides the above-mentioned embodiments, the scheme of the present embodiment can also be applied in the situation which has the switching cooperation problem among various protection technologies, for example, the Ethernet double protection, the MC-LAG protection, the Ethernet ring network protection, the linear protection of the MPLS network, the ring network protection of the MPLS network, the linear protection of the SDH network, the ring network protection of the SDH network and the multi-chassis protection, etc.

In another embodiment, a software is further provided, and the software is used for performing the technical scheme described in the above-mentioned embodiments and the preferred embodiments.

In another embodiment, a storage medium is further provided, the storage medium stores the above-mentioned software, and the storage medium includes the CD, the floppy disk, the hard disk, the erasable storage, etc.

Obviously, it can be understood by those skilled in the art that each module or each step above-mentioned in the present document can be implemented by the universal calculating apparatus, and they can be integrated in a single calculating apparatus, or distributed in the network made up by a plurality of calculating apparatus. Alternatively, they can be implemented by the executable program codes of the calculating apparatus. Accordingly, they can be stored in the storage apparatus and implemented by the calculating apparatus, and in some situation, the shown or described steps can be executed according to a sequence different from this place, or they are made to each integrated circuit module respectively, or a plurality of modules or steps therein are made into the single integrated circuit module to be implemented. This way, the present document is not limit to any specific form of the combination of the hardware and software.

The above description is only the preferred embodiments of the present document and is not intended to limit the present document. For those skilled in the art, the present document can have various modifications and variations. All of modifications, equivalents and/or variations without departing from the spirit and essence of the present document should be embodied in the scope of the appending claims of the present document.

INDUSTRIAL APPLICABILITY

Through the method, apparatus and system of the embodiment of the present document, the problem in the related art that different protection switching technologies cannot perform cooperative processing is solved, the occurrence of a flow interruption problem caused by different protection switching technologies in networking is avoided, and the network robustness and stability are improved.

What we claim is:

1. An announcement method, comprising:
   an announcement node configuring sending ports of the announcement node in a first network region and a second network region, wherein, different network protection switching technologies applied in the first network region and in the second network region;
   the announcement node acquiring a protection switching request sent from the first network region; and
   the announcement node sending the protection switching request to the second network region through a sending port corresponding to the second network region, wherein, a post-switching link state of the first network region is contained in the protection switching request, and under a situation that a source node of the first network region in the post-switching link state is inconsistent with a destination node of the second network region in a current link state, the second network region needs to perform protection switching; and under a situation that the source node of the first network region in the post-switching link state is consistent with the destination node of the second network region in the current link state, the second network region does not need to perform the protection switching.

2. The method according to claim 1, wherein, after the step of the announcement node sending the protection switching request to the second network region through the sending port corresponding to the second network region, further comprising:
   a protection switching apparatus in the second network region judging whether the source node of the first network region in the post-switching link state is inconsistent with the destination node of the second network region in the current link state and whether a priority of the protection switching request is no lower than a priority of a path failure request of the second network region itself;
   under a situation when determining that the source node of the first network region in the post-switching link state is inconsistent with the destination node of the second network region in the current link state and the priority of the protection switching request is no lower than the priority of the path failure request of the second network region itself, the second network region confirming to perform the protection switching.

3. The method according to claim 1, wherein, the step of the announcement node sending the protection switching request to the second network region through a sending port corresponding to the second network region comprises:
   the announcement node re-encapsulating the protection switching request according to a format of the second network region; and
   the announcement node sending the re-encapsulated protection switching request to the second network region through the sending port corresponding to the second network region.

4. The method according to claim 1, wherein, the different network protection switching technologies applied in the first network region and in the second network region comprises at least two of the following:
   an Ethernet double protection, a multi-chassis link aggregation group (MC-LAG) protection, an Ethernet ring network protection, a linear protection of a multi-protocol label switching (MPLS) network, a ring network protection of the MPLS network, a linear protection of a synchronous digital hierarchy (SDH) network, a ring network protection of the SDH network and a multi-chassis protection.

5. An announcement apparatus, located in an announcement node, comprising hardware performing instructions stored in a non-transitory computer readable medium which executes steps in following modules:
   a configuration module, configured to: configure sending ports of the announcement node in a first network region and a second network region, wherein, different network protection switching technologies applied in the first network region and in the second network region;
   an acquiring module, configured to: acquire a protection switching request sent from the first network region; and
   a sending module, configured to: send the protection switching request to the second network region through a sending port corresponding to the second network region, wherein, a post-switching link state of the first network region is contained in the protection switching request, and under a situation that a source node of the first network region in the post-switching link state is inconsistent with a destination node of the second network region in a current link state, the second network region needs to perform protection switching; and under a situation that the source node of the first network region in the post-switching link state is consistent with the destination node of the second network region in the current link state, the second network region does not need to perform the protection switching.

6. The apparatus according to claim 5, wherein, the sending module comprises:
   an encapsulation unit, configured to: re-encapsulate the protection switching request according to a format of the second network region; and
   a sending unit, configured to: send the re-encapsulated protection switching request to the second network region through the sending port corresponding to the second network region.

7. An announcement system, comprising an announcement apparatus located in an announcement node as described in claim 5, and a protection switching apparatus located in a second network region; wherein, the protection switching apparatus comprises hardware performing instructions stored in a non-transitory computer readable medium which executes steps in following modules:
   a judgment module, configured to: judge whether a source node of a first network region in a post-switching link state is inconsistent with a destination node of the second network region in a current link state and whether a priority of a protection switching request is no lower than a priority of a path failure request of the second network region itself; and
   a confirmation module, configured to: confirm whether to perform protection switching according to a judgment result of the judgment module.

8. The system according to claim 7, wherein,
   the confirmation module is configured to: under a situation of the judgment module determines that the source node of the first network region in the post-switching link state is inconsistent with the destination node of the second network region in the current link state, and that the priority of the protection switching request is no lower than the priority of the path failure request of the second network region itself, perform the protection switching.

9. The method according to claim 2, wherein, the step of the announcement node sending the protection switching request to the second network region through a sending port corresponding to the second network region comprises:
   the announcement node re-encapsulating the protection switching request according to a format of the second network region; and
   the announcement node sending the re-encapsulated protection switching request to the second network region through the sending port corresponding to the second network region.

10. The method according to claim 2, wherein, the different network protection switching technologies applied in the first network region and in the second network region comprises at least two of the following:
   an Ethernet double protection, a multi-chassis link aggregation group (MC-LAG) protection, an Ethernet ring network protection, a linear protection of a multi-protocol label switching (MPLS) network, a ring network protection of the MPLS network, a linear protection of a synchronous digital hierarchy (SDH) network, a ring network protection of the SDH network and a multi-chassis protection.

11. The method according to claim 3, wherein, the different network protection switching technologies applied the first network region and the second network region comprises at least two of the following:
   an Ethernet double protection, a multi-chassis link aggregation group (MC-LAG) protection, an Ethernet ring network protection, a linear protection of a multi-protocol label switching (MPLS) network, a ring network protection of the MPLS network, a linear protection of a synchronous digital hierarchy (SDH) network, a ring network protection of the SDH network and a multi-chassis protection.

* * * * *